US011724196B2

United States Patent
Kennett

(10) Patent No.: US 11,724,196 B2
(45) Date of Patent: Aug. 15, 2023

(54) ENHANCING GAMING CONTENT FOR PREVIOUSLY DEVELOPED GAMING APPLICATIONS

(71) Applicant: Microsoft Technology Licensing, LLC, Redmond, WA (US)

(72) Inventor: Daniel Gilbert Kennett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/348,499

(22) Filed: Jun. 15, 2021

(65) Prior Publication Data
US 2022/0395752 A1 Dec. 15, 2022

(51) Int. Cl.
*A63F 13/00* (2014.01)
*A63F 13/69* (2014.01)
*A63F 13/355* (2014.01)
*A63F 13/537* (2014.01)
*G06V 20/40* (2022.01)
*H04L 67/131* (2022.01)
*G06F 3/14* (2006.01)

(52) U.S. Cl.
CPC ............ *A63F 13/69* (2014.09); *A63F 13/355* (2014.09); *A63F 13/537* (2014.09); *G06F 3/14* (2013.01); *G06V 20/41* (2022.01); *H04L 67/131* (2022.05)

(58) Field of Classification Search
CPC .... A63F 13/355; A63F 13/335; A63F 13/352; A63F 13/86; A63F 13/35; A63F 13/30; A63F 13/67
See application file for complete search history.

(56) References Cited

U.S. PATENT DOCUMENTS

| 10,255,765 B2* | 4/2019 | Washington ........ G07F 17/3241 |
| 10,269,214 B2* | 4/2019 | Washington .......... A63F 13/837 |
| 2016/0259453 A1 | 9/2016 | Colenbrander et al. |

(Continued)

FOREIGN PATENT DOCUMENTS

EP 2961182 A1 * 12/2015 ......... G06F 3/04842

OTHER PUBLICATIONS

"International Search Report and Written Opinion Issued in PCT Application No. PCT/US22/029731", dated Aug. 12, 2022, 14 Pages.

*Primary Examiner* — David L Lewis
*Assistant Examiner* — Eric M Thomas
(74) *Attorney, Agent, or Firm* — Ray Quinney & Nebeker P.C; James Bullough

(57) ABSTRACT

The present disclosure relates to systems, methods, and computer-readable media for identifying a variety of events that occur within a gaming session and implementing one or more in-game enhancements based on the identified events. For example, a gaming service (e.g., a cloud gaming server) can leverage content analysis and event recognition services on a cloud computing system to detect one or more in-game events based on gaming content (e.g., video content, audio content, controller inputs) that is delivered to a client system. Systems described herein can cause in-game enhancements to be implemented on a client system in response to detected events. Detection of events and implementation of the various enhancements may be performed without significant redevelopment of gaming applications, even where a gaming application has been previously shipped.

20 Claims, 7 Drawing Sheets

(56) References Cited

U.S. PATENT DOCUMENTS

| | | |
|---|---|---|
| 2018/0280802 A1 | 10/2018 | Stroud |
| 2019/0272707 A1* | 9/2019 | Washington .......... A63F 13/837 |
| 2021/0129017 A1 | 5/2021 | White et al. |
| 2021/0162300 A1 | 6/2021 | Mueller et al. |

* cited by examiner

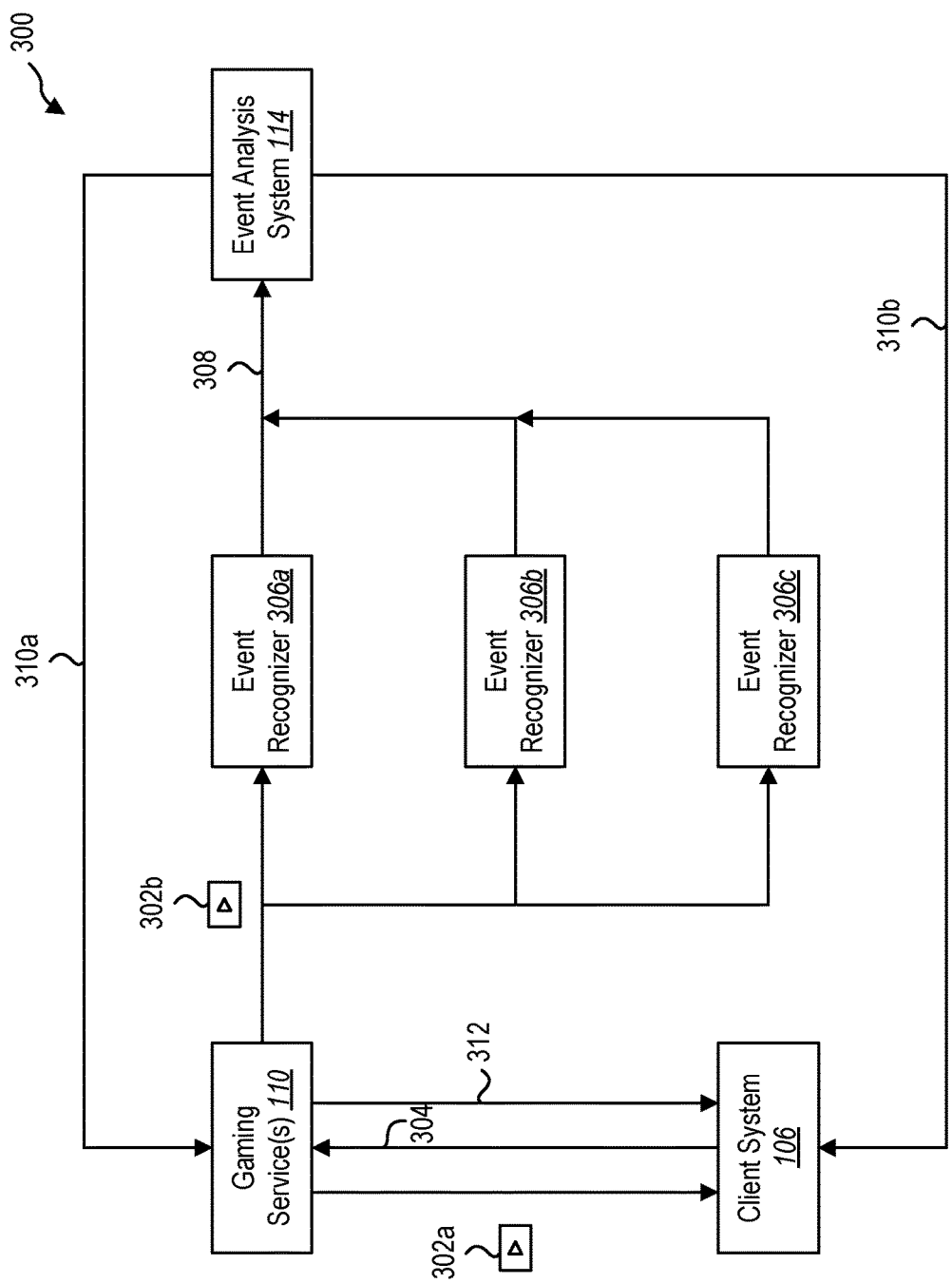

ENHANCING GAMING CONTENT FOR PREVIOUSLY DEVELOPED GAMING APPLICATIONS

BACKGROUND

Recent years have seen a precipitous rise in the use of remote computing resources to generate, process, and provide multi-media content. For example, cloud computing systems are now generating and delivering gaming content to a wide variety of local devices having a variety of computing and display capabilities. As video games and other content have become higher quality and as network bandwidth has increased, cloud-based gaming has become a more and more common platform for delivering gaming content to individuals.

By way of example, where a lot of popular gaming content used to be available via a select few gaming consoles specifically developed for generating and delivering gaming content from a particular set of gaming titles, cloud-based gaming has provided an avenue for gaming content from multiple publishers to be delivered via the same client device(s). In addition, different versions of gaming titles that were conventionally only playable on different systems are often made accessible via a single client system as a result of cloud-gaming. While increased access and ready availability to a larger collection of gaming titles has increased popularity of cloud-based gaming, there exist a number of difficulties associated with maintaining or otherwise increasing engagement with both new and old titles of gaming applications.

For instance, while cloud-based gaming provides ready-access to many previously shipped gaming titles, updating these games from previous versions is often a difficult and expensive process. For example, developers of previously shipped games have often moved on to developing newer games and are no longer compiling updates for previously shipped gaming applications. In many cases, older games have been archived or misplaced such that the source has been lost and implementing updates would involve redeveloping significant portions of the application software. Moreover, even where developing games is possible and developers are available, developing patches and other modifications to a gaming application and deploying those developments to a user base is often time-consuming and cost-prohibitive to publishers and providers of those gaming titles.

These and other problems exist with regard to developing and redeveloping gaming applications.

BRIEF DESCRIPTION OF THE DRAWINGS

FIG. 3 illustrates an example implementation of the gaming enhancement system in which enhancements to a gaming session are provided without redeveloping a source of the gaming application.

DETAILED DESCRIPTION

Figure 1:
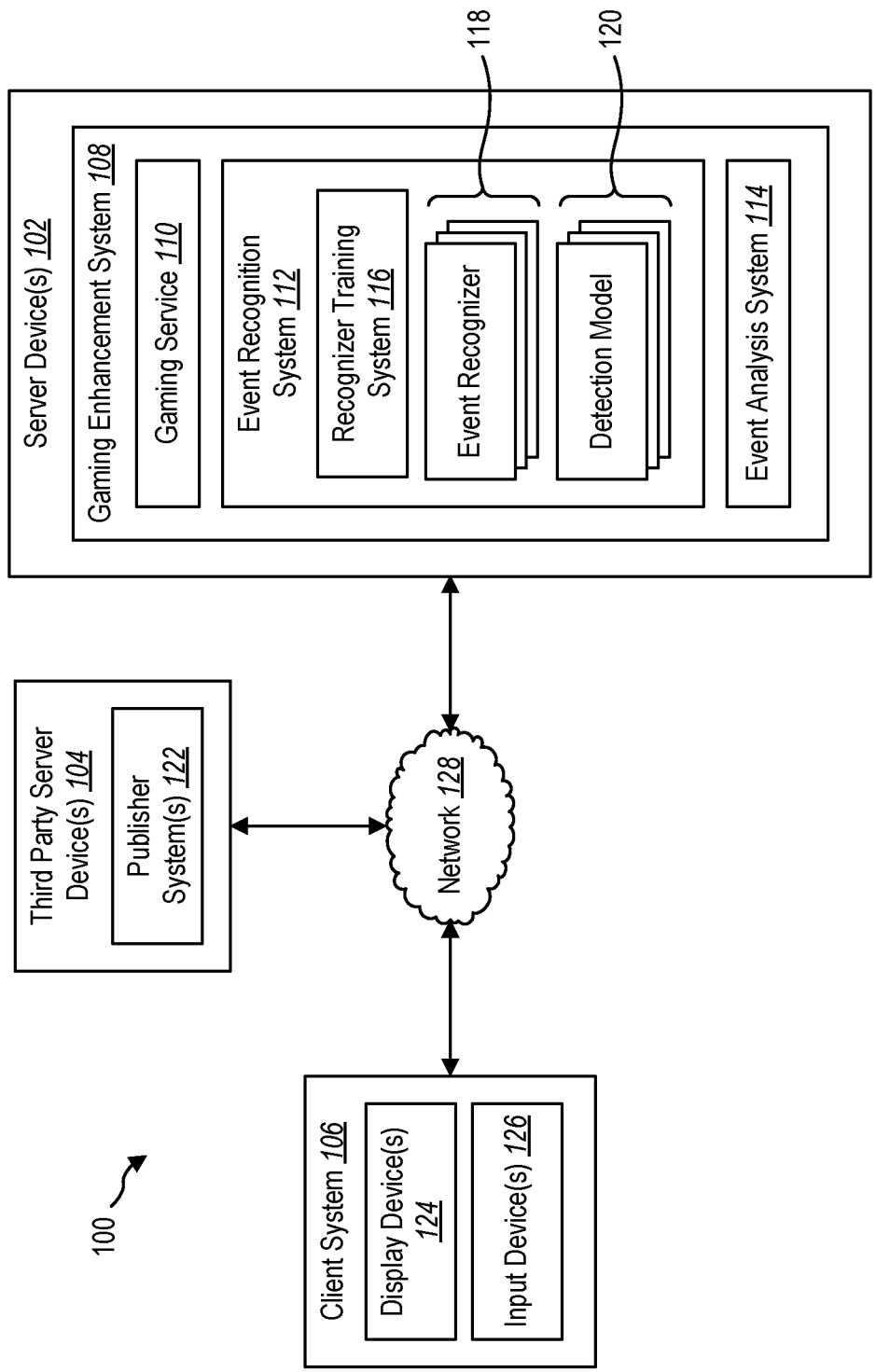
FIG. 1 illustrates an example implementation of a gaming enhancement system for generating and providing enhancements to gaming content in accordance with one or more embodiments.

The present disclosure relates generally to a gaming enhancement system that provides various enhancements to a gaming session in a way that does not involve time-consuming and cost-prohibitive developments to the gaming application software. For example, as will be discussed in further detail below, a gaming service (e.g., a cloud gaming service) can leverage content analysis and event recognition services of an event recognizer system implemented on a cloud computing system to detect a wide variety of in-game events and provide enhancements to the games based on those detected events. This can be performed without analyzing back-end processing signals and without involving modifications to the gaming application itself. Accordingly, systems and methods described herein can facilitate enhancing a wide variety of gaming applications in an efficient way and without requiring expensive and time-consuming development of the software for the gaming applications.

As an illustrative example, in one or more embodiments, a gaming enhancement system identifies gaming content for a gaming session. The gaming content may include video content as well as other types of content relevant to the gaming session (e.g., audio content, controller inputs). The gaming enhancement system may additionally apply one or more event recognizers to the gaming content to identify various events that detection models (e.g., machine learning models) of the event recognizer(s) have been trained to detect. The gaming enhancement system can identify one or more in-game enhancements associated with the detected event(s) and, based on detecting one or more instances of the event(s), cause the in-game enhancements to be implemented on a client system in conjunction with a presentation of the gaming session on the client system.

The present disclosure includes a number of practical applications that provide benefits and/or solve problems associated with enhancing gaming content in conjunction with delivering the gaming content to a client system. Some example benefits are discussed in further detail below. It will be understood that these examples are provided by way of example, and a significant number of additional benefits and practical applications are realized by features and functionalities described herein in connection with the gaming enhancement system and associated components.

As a first example, the systems described herein facilitate enhancement of gaming sessions in a wide variety of ways without requiring expensive and time-consuming software development of the underlying software code for the gaming application(s). Rather, as will be discussed in further detail below, an event recognizer may include one or more detection models that are trained to detect signals indicative of a particular event based on analysis of gaming content (e.g., video content). Because the recognizers are trained to detect various events based on gaming content (e.g., rather than underlying code or back-end processing data), the systems described herein can be trained to detect events and provide associated enhancements without requiring access to software, source code, or processing signals of the gaming application.

Systems described herein further provide a flexible environment for detecting a wide variety of events on a wide variety of gaming applications associated with any number of publishers. For example, by training models of event recognizers to evaluate video content, one or more event recognizers can be trained to recognize events across multiple applications, including applications of different titles and/or associated with different publishers. For example, a first recognizer may be trained to detect instances of an event on gaming sessions for a first gaming application while a second recognizer (or simply additional models of the first recognizer) is trained to identify instances of the event (or similar type of event) on gaming sessions for a second gaming application. In this way, similar enhancements based on similar events may be applied to multiple titles and across multiple publishers without redeveloping individual updates (e.g., software patches, new application versions) for each of the different titles and/or publishers.

Further benefits are realized in connection with one or more embodiments described herein by leveraging computing capabilities and resources of the cloud. For example, by implementing both gaming services and recognition event services on a common cloud computing system, game-processing tasks as well as event recognition tasks can be provided without interfering with a gaming session from the perspective of an end-user. Moreover, because many systems and services described herein are implemented on the cloud, any number of recognizers can be tasked with detecting any number of events for a particular gaming session. This provides a benefit over conventional gaming consoles where attempting to implement these services on a local gaming console would very likely interfere with performance of the console in delivering gaming content to an end-user. Accordingly, as will be discussed in further detail below, the gaming enhancement system can provide any number of enhancements without detracting from audio-visual demands of gaming console(s) involved in delivering gaming content of the gaming session to a client system.

As illustrated in the foregoing discussion, the present disclosure utilizes a variety of terms to described features and advantages of the systems, methods, and computer-readable media described herein. Additional detail is now provided regarding the meaning of some of these terms.

As used herein, a "cloud computing system" refers to a network of connected computing devices that provide various services to computing devices (e.g., customer devices). For example, a cloud computing system may include a collection of physical server devices (e.g., server nodes, gaming consoles) organized in a hierarchical structure including clusters, computing zones, virtual local area network (VLANs), racks, fault domains, etc. In one or more embodiments, the server devices may be implemented within a datacenter (e.g., a regional datacenter) including any number of server devices connected via an internal network of the datacenter and which provides any number of cloud computing services to clients of the cloud computing system. In one or more embodiments described herein, the cloud computing system includes gaming consoles and other server nodes that cooperatively perform features and functionalities described herein in connection with detecting instances of events within a gaming session and causing enhancements to the gaming session to be implemented on a client system.

As used herein, a "client system" refers to one or more devices over which digital content (e.g., gaming content) is provided to a user. For example, a client system may include a local streaming device, a display device, one or more controllers for providing input commands, and any other device configured to provide content to a user. In one or more embodiments, a client system refers to a combination of multiple devices (e.g., a local gaming console, a television, and a gaming controller). In one or more implementations, a client system refers to a single or integrated computing device, such as a laptop computer or a mobile device.

As used herein, "gaming content" refers to any content associated with how a user may experience a gaming session. For example, in one or more embodiments described herein, gaming content refers to video content that is displayed via a display device having a display screen and/or graphical user interface displayed thereon. In addition, gaming content may refer to audio content that is presented via a speaker or other audio display device. In one or more embodiments, gaming content may refer to tactile feedback and/or visual feedback provided via a non-display device, such as a vibration or rumble of a gaming controller or a light that can turn on and/or change colors (e.g., keyboard lights, controller lights). In one or more embodiments, gaming content refers to user inputs or user commands that can affect the gaming content presented via a display device. Indeed, gaming content may refer to any gaming content and associated data that is delivered or otherwise presented via a device of a client system and experienced or otherwise consumed by a user.

As used herein, a "gaming session" refers to an instance of a gaming application that is running on one or more devices. For example, a gaming session may refer to some period of time associated with starting up or initiating engagement with a gaming application or gaming service and logging off or otherwise disengaging from the gaming application or service. To illustrate, a gaming session may include an instance in which a user initiates a video game, plays the video game for some period of time, and either logs off, closes the application, or simply disengaged from the video game for some period of time (e.g., a threshold period of inactivity). In another implementation, a gaming session may include an instance in which a user logs onto a gaming service or platform, plays one or multiple video games that are hosted or otherwise accessible via the gaming service or platform, and either logs off, closes the service, or simply disengaged from the gaming service for some period of time.

In one or more embodiments described herein, a gaming enhancement system may cause one or more enhancements to be implemented on a gaming system in conjunction with a gaming session. As used herein, an "enhancement" or "in-game enhancement" may refer to additional content or augmentation to gaming content that can be provided via a client system. For example, an enhancement may refer to a graphical icon that is displayed in conjunction with video content from the gaming content. In another example, an enhancement may refer to audio content or tactile feedback that is presented via a gaming device and/or controller device. In one or more embodiments, an enhancement may refer to removal of a portion of gaming content, such as decreasing a volume of audio content, or removing some graphical icon or text from a display. Indeed, an in-game enhancement may refer to any modification of gaming content as it is delivered to a user via a client system.

As used herein, a "recognizer" or "event recognizer" may refer to a component of the gaming enhancement system having one or more models (e.g., machine learning models) that are trained to detect objects, content, or any detectable event within gaming content that is provided to a client system. For example, a recognizer may include one or more models that have been trained to detect various objects, combinations of objects, series of inputs, or combination of any number of signals that are indicative of an instance of an event that occurs within a gaming session. By way of example and not limitation, where a character in a gaming session jumps, a recognizer may be trained to detect a series of movements or objects that are indicative of a character jumping and generate an output indicating an instance of a jump and associated information within a gaming session. Other examples and use-cases will be discussed in connection with one or more embodiments described herein.

As used herein, an "event" or "in-game event" refers to a series of signals that are associated with a defined in-game event. For example, and as will be discussed in further detail below, an in-game event may refer to a series of signals associated with a particular happening or occurrence within a gaming session. As indicated above, an in-game event may refer to a character jumping within a gaming session. Other in-game events may include occurrences such as a character dying, starting a new level, finishing a level, pausing the game, pausing the game more than a threshold period of time, unpausing the game, winning a race, losing a race, finishing a race, finishing a race within a predetermined amount of time.

Indeed, in-game events may be defined to include any number of occurrences (or even multiple defined events) as defined by a user, administrator, a developer, or other entity. In-game events may refer to combinations of one or more signals based on outputs of various models that make up one or more recognizers. While an event may be specific to a particular gaming application, in one or more embodiments described herein, an event may include instances of the event that occur across different gaming applications, different generations of similar gaming applications (e.g., different versions or editions of a common gaming title), and even across gaming applications associated with completely different genres and publishers.

Additional detail will now be provided regarding systems for detecting in-game events and providing enhancements to a gaming-session in response to the detected in-game events. For example, FIG. 1 illustrates an example environment 100 within which a gaming enhancement system 108 is implemented in accordance with one or more embodiments. As shown in FIG. 1, the environment 100 includes server device(s) 102, which may include any number of server nodes of a cloud computing system. As further shown, the environment 100 may include one or more third-party server device(s) 104 and a client system 106 (e.g., a client gaming system).

As shown in FIG. 1, the server device(s) 102 may include a gaming enhancement system 108 implemented thereon, which may include a gaming service 110, an event recognizer system 112, and an event analysis system 114. Each of these components 110-114 and associated features and functionality may be implemented across multiple server devices of a cloud computing system. Alternatively, features and functionality discussed in connection with respective components 110-114 of the gaming enhancement system 108 may be performed on the same server devices. As further shown in FIG. 1, the event recognizer system 112 may include a recognizer training system 116 (or simply a "training system"), event recognizers 118, and detection models 120. Each of these components will be discussed in further detail below.

As mentioned above, the environment 100 may include one or more third-party server device(s) 104 having one or more publisher system(s) 122 implemented thereon. The publisher system(s) 122 may include provider or publisher-specific services hosted by various publishers associated with one or more gaming applications. In one or more embodiments, the publisher system(s) 122 may maintain original copies of gaming applications as well as user information associated with user(s) of the client system 106. While FIG. 1 illustrates an example implementation in which a publisher system 122 is hosted on one or more third-party server device(s) 104, it will be appreciated that one or more features of the publisher system(s) 122 may be implemented on the gaming service 110 or other component(s) 112-114 of the gaming enhancement system 108 and on the same cloud computing system as the illustrated server device(s) 102. For example, where the same entity that provides the gaming service 110 also provides specific gaming content, or where a third-party publisher provides full access to a gaming application to be hosted by the gaming service 110, features of the publisher system(s) 122 may be implemented on the gaming enhancement system 108.

As shown in FIG. 1, the client system 106 may include one or more display device(s) 124 and one or more input device(s) 126. For example, as mentioned above, a client system 106 may include a local computing device (e.g., a gaming console) coupled to various hardware for providing gaming content of a gaming session to a user of the client system 106. In one or more embodiments, this may include separate display device(s) 124 and input device(s) 126 (e.g., a desktop computer and keyboard/mouse, a television and gaming controller coupled to a local console). In one or more embodiments, the display device(s) 124 and input device(s) 126 are part of a single or otherwise integrated computing system (e.g., a laptop computer, a mobile device).

Indeed, it will be appreciated that the client system 106 may refer to various types of computing devices coupled to or otherwise including a display device 124 and/or an input device 126. For example, the client system 106 may include a mobile device, such as a mobile telephone, a smart phone, a personal digital assistant (PDA), a tablet, or a laptop. Additionally, or alternatively, the client system 106 may include one or more non-mobile devices such as a desktop computer, server device, or other non-portable device. In one or more implementations, the client system 106 refers to dedicated gaming devices (e.g., handheld gaming devices) or a video game console in communication with a display device. In one or more implementations, the client system 106 may include graphical user interfaces integrated thereon (e.g., a screen of a mobile device). In addition, or as an alternative, the client system 106 may be communicatively coupled (e.g., wired or wirelessly) to a display device having a graphical user interface thereon for providing a display of visual gaming content. It will also be appreciated that the server device(s) 102 and third-party server device(s) 104 may refer to a variety of computing device. Each of the devices and systems 102-106 of the environment 100 may include features and functionality described below in connection with FIG. 7.

As shown in FIG. 1, the server device(s) 102, third-party server device(s) 104 and client system 106 can communicate with each other directly or indirectly through a network 128.

The network 128 may include one or multiple networks and may use one or more communication platforms or technologies suitable for transmitting data. The network 128 may refer to any data link that enables transport of electronic data between devices and/or modules of the environment 100. The network 128 may refer to a hardwired network, a wireless network, or a combination of a hardwired and a wireless network. In one or more embodiments, the network 128 includes the Internet.

As will be discussed in further detail below, the gaming service 110 may provide one or more services associated with hosting and delivering gaming content to the client system 106. For example, in one or more embodiments, the gaming service 110 refers to a cloud-based gaming service in which one or more physical gaming consoles on a cloud computing system can host gaming sessions and deliver gaming content to the client system 106. In this example, the gaming consoles may run or host a gaming session and process inputs received from the client system 106 (e.g., from the input device(s) 126). In one or more embodiments, the gaming service 110 can stream or otherwise deliver the gaming content to the client system 106 over the network 128.

In addition to delivering gaming content to the client system 106, the gaming service 110 may provide a copy or feed of the gaming content to the event recognizer system 112. The gaming service 110 may also provide indications of input commands received in connection with the gaming content. As will be discussed in further detail below, the event recognizer system 112 may apply one or more event recognizers 118 to the gaming content to identify instances of one or more events that occur within a gaming session. As shown in FIG. 1, the event recognizers 118 may make use of any number of detection models 120 having been trained (e.g., by the recognizer training system 116) to detect various signals indicative of one or more events that occur within a gaming session.

Upon identifying one or more instances of an event, the event recognizer system 112 can provide event information to an event analysis system 114. The event analysis system 114 can associate the event(s) with one or more in-game enhancements. Based on this association, the event analysis system 114 may determine to enhance the gaming content being provided to the client system 106. As will be discussed in further detail below, the event analysis system 114 can enhance a gaming session in a variety of ways. For example, in one or more embodiments, the event analysis system 114 can provide enhancement instructions or commands to the gaming service 110 that enable the gaming service 110 to provide enhanced content to the client system 106 over the network 128. In one or more embodiments, the event analysis system 114 provides enhancement instructions to one or more components of the client system 106 to enable the client system 106 to locally execute the enhancement instructions and present the one or more local enhancements.

Figure 2:
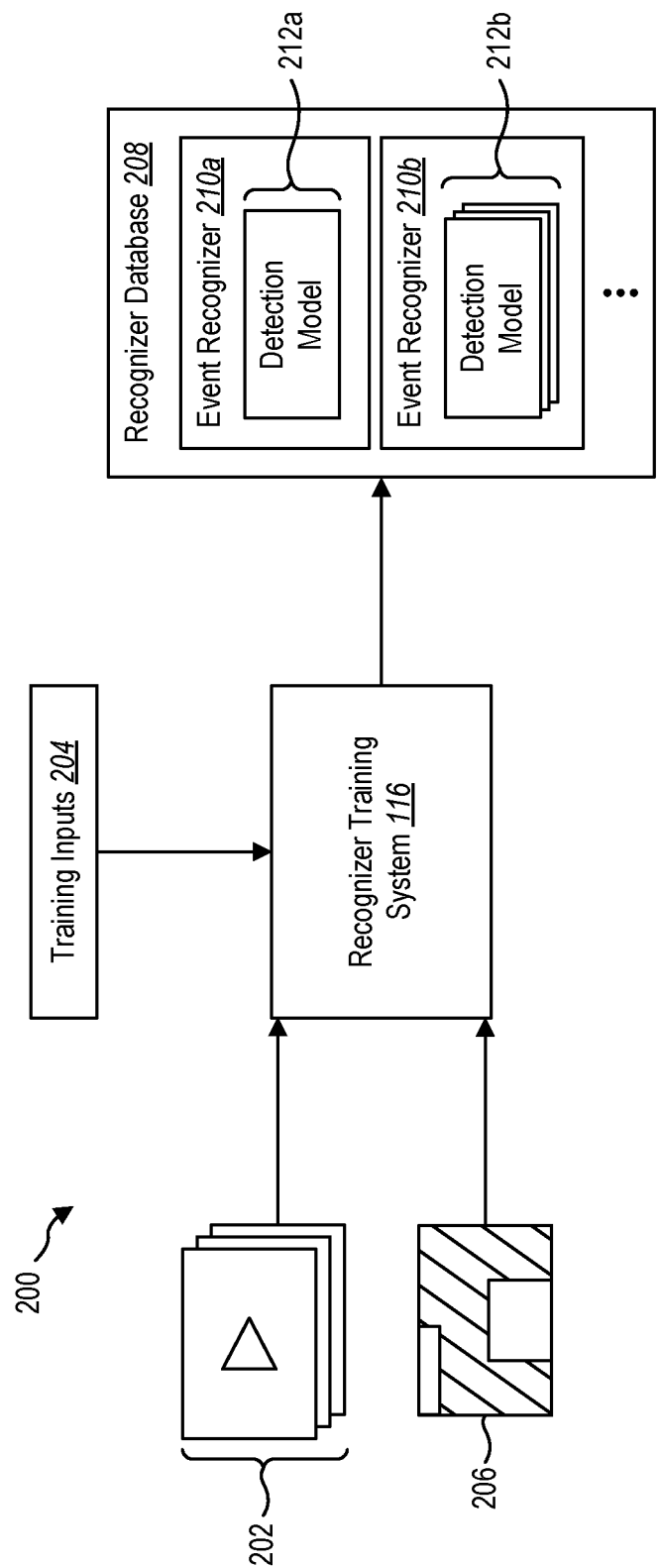
FIG. 2 illustrates an example implementation of the gaming enhancement system in which event recognizers are trained to detect in-game events in accordance with one or more embodiments.

FIG. 2 illustrates an example implementation of the gaming enhancement system 108 in which event recognizers can be trained to detect various events in accordance with one or more embodiments. FIG. 2 illustrates an example workflow 200 in which an example implementation of the recognizer training system 116 can train one or more recognizers to detect various events based on gaming content associated with a given gaming session.

As will be discussed below, the recognizer training system 116 may be trained based on a variety of training data. In particular, in the workflow 200 shown in FIG. 2, the recognizer training system 116 may receive a collection of video frames 202 including digital images of video content for one or more gaming sessions. In one or more embodiments, the video frames 202 refer to previously recorded and saved video content associated with one or more gaming sessions within which various events have occurred.

In one or more embodiments, the recognizer training system 116 receives additional gaming content and training data associated with the video frames 202. For example, in one or more embodiments, the recognizer training system 116 receives audio content that is relevant to or that was otherwise presented in conjunction with the video frames 202. In one or more implementations, the recognizer training system 116 further receives input data including an indication of any input commands that were received in conjunction with the corresponding video frames 202 and associated audio data. For example, the video frames may be associated with corresponding timestamps that may be used to associate the video frames 202 with corresponding audio content, input commands, and any other gaming content associated with a corresponding gaming session.

In addition to the video frames 202 and any additional gaming content, the recognizer training system 116 may further receive training inputs 204 associated with the corresponding video frames 202. In particular, the recognizer training system 116 may receive training inputs 204 indicating ground truths associated with one or more events that are determined to occur within the corresponding gaming content. In one or more embodiments, the training inputs 204 may refer to human inputs or other supervised training inputs that provide ground truth or highly accurate predictions of truth data corresponding to a specific event or type of event that occurred within the video frames 202.

By way of example, if the recognizer training system 116 is being used to train or otherwise generate an event recognizer to recognize a pause event associated with a game being paused, the recognizer training system 116 may receive training inputs 204 indicating whether the game is paused for a given video frame. In one or more embodiments, this may be based on tags provided by users based on observations of the users with respect to the video frames 202 and other gaming content. As a simple example, where a video frame includes a display of a pause menu or other visible icon indicating that a gaming session is paused, a corresponding training input 204 would indicate that the game is paused for a given video frame. Conversely, where a video frame does not include a display of a pause menu or other pause-indicating icon, a corresponding training input 204 would indicate that the game is not paused.

The recognizer training system 116 may utilize these input video frames 202 and associated training inputs 204 to train an event detection model to imitate the training inputs and predict whether a gaming session is paused based on correlations between the training inputs 204 and various features or characteristics of the tagged video frames 202. In this way, one or more pause detection models may be trained to recognize when a game is paused based on a display of a pause icon or any combination of observed signals (e.g., pause music, lack of movement, a received pause input) that would enable the model and associated event recognizer to accurately predict when a gaming session is paused.

The detection models (e.g., detection models 212a-b) may refer to a variety of models and algorithms that may be used to predict various signals and ultimately determine whether an instance of an event corresponding to the signal(s) has occurred within a gaming session. In one or more embodiments, the detection models may refer to machine learning models or other deep learning models. As used herein, a "machine learning model" may refer to one or more computer algorithms or models (e.g., a classification model, a regression model) that can be tuned (e.g., trained) based on training input to approximate unknown functions. For example, a machine learning model may refer to a neural network (e.g., a convolutional neural network, a recurrent neural network) or other architecture that learns and approximates complex functions and generates outputs based on one or more inputs provided to the machine learning model. As will be discussed in connection with various examples herein, different machine learning models may generate various output signals that may be combined or otherwise considered by a recognizer to determine whether an event has occurred for a corresponding portion of gaming content (e.g., within a particular video frame or series of video frames).

In training the various models and recognizers, in one or more implementations, the recognizer training system 116 may receive area of interest information 206 associated with locations within the gaming content that various events are likely to occur. As shown in FIG. 2, the recognizer training system 116 may receive area of interest information 206 including a segmentation mask that indicates areas of the video frames 202 that should be considered in determining whether an instance of an event occurs within a corresponding video frame. In this way, the recognizer training system 116 may discount or simply not consider other portions of the video frames in training models to detect various signals and events. This limitation of training to areas of interest of the video frames 202 can enable the recognizer training system 116 to more efficiently train the various machine learning models in less time and using less training data.

In addition to more efficiently training the various event detection models and recognizers, providing area of interest information 206 may provide useful information for training models associated with detecting events of similar types between different gaming applications. As an example, where an event refers to an occurrence in which an avatar's health bar falls below some threshold level or percentage, the area of interest may indicate a first portion of video frames within which the health bar would appear for a first gaming application. Similarly, the area of interest may indicate a second portion of video frames (e.g., a different region within the video frames) within which the health bar would appear for a second gaming application. While this may involve training two different models for the respective gaming applications to detect similar events, the models may nonetheless be trained using relatively fewer video frames and associated training inputs than where entire portions of video frames would be considered in training the corresponding event detection models.

Upon training the various models, the recognizer training system 116 may provide the event recognizers and associated detection models to a recognizer database 208. As shown in FIG. 2, the recognizer database 208 may include a plurality of event recognizers and associated detection model(s) (e.g., one or multiple models). For example, the recognizer database 208 may include a first event recognizer 210a having an associated detection model 212a. As further shown, the recognizer database 208 may include a second event recognizer 210b and an associated set of detection models 212b.

As shown in FIG. 2, various event recognizers may include one or multiple models therein based on a number of considerations and specifics of the unique events that the recognizers are trained to detect. For example, in one or more embodiments, recognizing a simple event such as appearance of a black screen may involve a single model trained to detect occurrence of a threshold number of black video frames. Alternatively, recognizing a more complex event, such as an event titled "barely passing a level" may involve a first model trained to detect that a health bar is below a threshold level in addition to a second one or more models trained to detect that a level has been passed. In one or more embodiments, functionality of these models may be combined for a particular event recognizer to detect a corresponding in-game event (e.g., passing a level having less than a threshold amount of avatar health).

In addition to the event recognizers having one or multiple models, in one or more embodiments, one or more models may be utilized by different recognizers. For example, in one or more embodiments, when tasked with training an event recognizer, the recognizer training system 116 may identify a previously trained model or commonly used model that relates to a number of different events and incorporate functionality of the model within the event recognizer. In this way, as the recognizer database 208 becomes more robust over time, the recognizer training system 116 may leverage functionality of previously trained models or simply fine-tune existing models to fit within a defined functionality of one or multiple event recognizers.

FIG. 3 illustrates an example implementation of the gaming enhancement system 108 in which previously trained event recognizers are used to detect various in-game events. For example, FIG. 3 illustrates an example workflow 300 showing a flow of data and gaming content between the gaming service 110, event recognizer system 112, and the event analysis system 114 on a cloud computing system. In particular, as mentioned above, and as will be discussed in further detail below, the components 110-114 of the gaming enhancement system 108 may cooperatively identify instances of a variety of in-game events that occur within a gaming session and provide one or more enhancements without requiring redeployment or redevelopment of an associated gaming application.

As shown in FIG. 3, the gaming service 110 can provide first gaming content 302a (e.g., original gaming content) to a client system 106. In one or more embodiments, the first gaming content 302a refers to an original feed of gaming content being streamed or otherwise delivered to a client system 106. In one or more embodiments, the gaming service 110 includes a cloud-based gaming console that generates and processes gaming content (e.g., multi-media content) and delivers the first gaming content 302a to be displayed on a display device of the client system 106.

As shown in FIG. 3, the client system 106 may provide input commands 304 associated with the first gaming content 302a. In particular, where the client system 106 includes one or more controller devices (e.g., a keyboard, mouse, gaming controller, touch screen interface) capable of detecting user inputs, the client system 106 may provide input commands 304 including the various inputs as they are received at an input device(s) of the client system 106. In one or more embodiments, the gaming service 110 processes the input commands, implements the commands within the gaming session, and continues to provide the first gaming content 302a based on the input commands. While this processing is performed on the gaming service 110; from a user's perspective, the delivery and processing of the input commands may be very similar to conventional systems in which a local gaming console hosts and provides gaming content and processing local input commands.

At a same time or at some point after delivering the first gaming content 302a to the client system 106, a second gaming content 302b (e.g., a copy of the original gaming content) can be provided to event recognizers of an event recognizer system 112. In the example shown in FIG. 3, the copy of the gaming content 302b is provided to each of a plurality of event recognizers 306a-c that have been respectively trained to detect in-game events. For example, a first event recognizer 306a may include one or more machine learning models trained to detect instances of a first type of event, a second event recognizer 306b may include one or more machine learning models trained to detect instances of a second type of event, and a third event recognizer 306c may include one or more machine learning models trained to detect instances of a third type of event.

While FIG. 3 shows an example including three event recognizers 306a-c individually trained to detect different types of events, other implementations may include fewer or additional event recognizers trained to detect any number of events. For example, in one or more embodiments, a copy of the gaming content 302b may be provided to each of multiple event recognizers simultaneously to be processed in parallel.

As mentioned above, the copy of the gaming content 302b may be provided to the event recognizers 306a-c at the same time as the original gaming content 302a is delivered to the client system 106. Alternatively, in one or more embodiments, the copy of the gaming content 302b is provided to the event recognizers after the fact for purposes of telemetry tracking and, in some cases, additional training of the event recognizers 306a-c.

In addition, in one or more embodiments, one or more event recognizers may be used to detect events in real-time as the original gaming content is delivered to the client system 106 while one or more additional event recognizers may be used to detect events after the fact for other enhancement-related purposes. For example, in one or more embodiments, an event recognizer may detect an event based on a history of events observed over a prolonged period of time. Accordingly, tracking and maintaining a current count of event instances may not be as crucial for a particular event-type and rather than using computing resources at a period of peak demand for a cloud computing system, the event recognizer(s) may be more efficiently utilized during periods of non-peak computing demand on the cloud computing system. In this and other examples, the event recognizer system 112 may run one or more event recognizers as part of a batch processing job.

Another example in which real-time recognition may be less necessary is in the context of watching replays of gaming sessions. Indeed, as watching replays of gaming sessions has increased in popularity, one or more event recognizers may be applied to video and other gaming content after the fact (i.e., after a time at which original gaming content is delivered in real-time to the client system 106) and various in-game events may be identified for purposes of enhancing a replay of a gaming session. This may include icons indicating specific in-game events or any other event in accordance with embodiments described herein.

In either implementation related to analyzing the copy of the gaming content 302b delayed or in real-time, the recognizer training system 116 may generate output signals 308 from the event recognizers 306a-c indicating whether one or more instances of events are detected for a corresponding portion of the gaming content (e.g., a video frame or range of multiple video frames). As shown in FIG. 3, the output signals 308 may be provided to an event analysis system 114 for further processing.

In particular, as mentioned above, in one or more embodiments, the event analysis system 114 can receive the indicated instances of events at corresponding portions or timestamps of the gaming content and determine an associated enhancement that applies to the event(s). In one or more embodiments, the event analysis system 114 maintains mapping data that enables the event analysis system 114 to associate any number of output signals 308 indicating occurrence of events with corresponding enhancements to be implemented on the client system 106.

In addition to generally providing output signals 308 indicating instances of events, the event analysis system 114 may receive information associated with the individual or hardware associated with the specific client system 106 that is receiving (or has received) the original gaming content 302a. In one or more embodiments, the output signals 308 include JavaScript Object Notation (JSON) objects including an indication of a corresponding event and a gamer tag or user identifier that may be used to identify a particular gaming session and/or the relevant client system 106 for which an in-game enhancement would apply. Other types of data objects having a variety of file formats may similarly be used to convey information associated with detected events and corresponding gaming sessions.

Upon associating the detected event instance with a corresponding enhancement, the event analysis system 114 may identify enhancement instructions or commands including specific data that is executable by one or more of the gaming service 110 and/or client system 106. In particular, the event analysis system 114 may identify enhancement instructions that enable a particular enhancement to be implemented in conjunction with a presentation of a gaming session on the client system 106. This may include specific graphics and associated commands for displaying the graphics in conjunction with a presentation of the original gaming content 302a. This may include instructions for presenting tactile, audio, or other gaming content that can be consumed by a user of the client system 106. One or more examples of specific types of enhancements to the gaming session will be discussed below in connection with FIGS. 4A-5.

As mentioned above, the event analysis system 114 may cause enhancements to a gaming session to be implemented on the client system 106 in a variety of ways. In a first example, the event analysis system 114 may provide enhancement instructions 310a to the gaming service 110 to incorporate within a presentation of the gaming content 302a. In this example, a gaming console on the gaming service 110 may receive the enhancement instructions 310a and deliver or other provide enhanced gaming content 312 to the client system 106 to be presented via one or more devices of the client system 106. In one or more embodiments, the enhanced gaming content 312 includes one or more displayable icons that are presented in conjunction with video frames of the original gaming content 302a. In one or more embodiments, the enhanced gaming content 312 includes additional sounds or modifications to sounds from the original gaming content 302a delivered to the client system 106. In one or more embodiments, the enhanced gaming content 312 includes executable instructions by a controller device to vibrate or rumble where the original gaming content 302 may not include a similar command. \

As a second example, in addition to or as an alternative to providing the enhancement instructions 310a to the gaming service 110 for further processing, in one or more embodiments, the event analysis system 114 provides enhancement instructions 310b directly to the client system 106. While these enhancement instructions may not necessarily be the same or even relate to enhancement instructions for enhancing video content provided by the gaming service 110, the enhancement instructions 310b may include instructions associated with providing tactile feedback, audio feedback, and/or visual feedback on an input device, such as a keyboard or gaming controller capable of receiving and executing various instructions.

Where each of the components 110-114 of the gaming enhancement system 108 and the client system 106 may be located remotely from one another, there may be brief periods in which latency may cause one or more issues in delivering and presenting enhancements in conjunction with gaming content 302a that is being delivered to the client system 106. Where some events and associated enhancements may be less impacted by some latency, there are other events and associated enhancements that may interrupt a gaming experience if delayed by too much time. For example, where an enhancement refers to a mini-map displayed on a portion of a screen, latency may not be as much of an issue, and the enhancement may be presented independent of an amount of latency detected by the client system 106.

Alternatively, where an enhancement refers to a vibration of a controller based on a detected event in real-time or a display of information that aids a user in providing a specific input command to overcome an in-game challenge in a timely manner (or a wide variety of events and associated enhancements), presenting these enhancements may disrupt a gaming session or cause confusion to an end-user because of an observed delay. In one or more embodiments, the gaming enhancement system 108 may prevent instances of delayed enhancements by passing timing information (e.g., timestamps) with the copy of the gaming content 302b and continuing to pass the timing information with the output signals 308 (e.g., within the JSON objects) to the event analysis system 114. The event analysis system 114 may further include this timing information when providing the enhancement instructions 310a-b to the gaming service 110 and the client system 106.

This timing information may be used to determine whether to discard the enhancement or to implement the enhancement within a presentation of the gaming session. For example, where the enhancement instructions 310a are providing to the gaming service 110, the gaming service 110 may determine whether providing the enhanced gaming content 312 would be delayed beyond a threshold period of time (e.g., 200 milliseconds) and simply continue to provide the original gaming content 302a without the associated enhancements. In one or more embodiments, each of the events may be associated with a threshold delay time that is acceptable in determining whether to provide the enhanced gaming content 312 to the client system 106.

In the example where the enhancement instructions 310b are provided directly to the client system 106, the client system 106 may receive the timing information and locally decide whether to provide the enhancement to the gaming content 302a being provided from the gaming service 110. In one or more embodiments, the enhancement instructions 310b may similarly include both the timestamp associated with the live gaming content 302a as well an indicated threshold period of time that the enhancement may be delayed without interrupting the gaming experience (e.g., an overly delayed rumble of a gaming controller). In this example, the gaming service 110 may locally determine whether the threshold period of time has passed from the timestamp. If the threshold period of time has passed, the client system 106 may decide against implementing the enhancement. Otherwise, the enhancement may be presented in conjunction with a presentation of the original gaming content 302a (e.g., within an acceptable delay as defined by the enhancement instructions 310b).

Additional detail will now be discussed in connection with example implementations in which a variety of enhancements are presented in combination with gaming content that is provided to a client device. For example, FIG. 4A shows an example environment showing a gaming service 110 that provides original gaming content 402a to a client system. As shown in FIG. 4A, the client system may include a client device 404 that displays video content from the received gaming content 402a via a graphical user interface 406 on the client device 404. As further shown, the client system may provide input commands 403 to the gaming service 110 for execution on one or more remote gaming consoles that are generating and delivering the original gaming content 402a.

As further shown in FIG. 4A, the gaming service 110 may provide a copy of the gaming content 402b to any number of event recognizers that are trained to detect a variety of events within the gaming content being delivered to the client system. In this example, the relevant gaming content may be related to a racing application including video content showing various information. For instance, as shown in FIG. 4A, a dashboard icon may appear in a lower-left portion of the graphical user interface 406 showing a variety of information that may be detected from one or more event recognizers. For example, an event recognizer may determine a revolutions per minute (RPM) metric associated with a displayed gauge. Another event recognizer may track or otherwise determine a current speed of a car in the racing application. Another event recognizer may track a displayed ranking of a racer based on appearance of text displayed via the graphical user interface 406 indicating a current rank of the car in the racing application.

In accordance with one or more embodiments described above, any number of event recognizers may utilize one or multiple event detection models (e.g., machine learning models) to detect or otherwise identify a wide variety of events which, in many cases, may be based on a combination of multiple observed signals. As an illustrative example, an event recognizer may be trained to determine a current placement of a user on a map of a virtual environment based on a history of tracked movement and turns performed by the user (and other users) over time. This may be based on any number of machine learning models trained to track movement of a car (e.g., within a virtual environment of a gaming session for the racing application). The same or other recognizers may be applied to historical data to generate a map representative of a given racing environment. This information may be used by an event recognizer to determine a current location of a car in the racing environment.

As another example, a recognizer may be trained to determine whether a car within the virtual environment is moving at a speed above a predetermined threshold. In this example, the event recognizer may determine that the car is at a speed above a threshold of one hundred miles per hour (MPH) based on detected text displayed within the dashboard icon in the bottom-left of the screen. In accordance with one or more embodiments described above, the recognizer may make the determination for the speed-based event based on selectively evaluating the lower-left portion of the screen based on a segmentation mask or other indicator of an area of interest associated with a known location of the dashboard icon.

As noted above, the recognizer may be trained to detect multiple related events associated with a corresponding enhancement. For instance, in the example illustrated in FIG. 4A, a recognizer may be trained to determine that the car is moving above a threshold speed while approaching a turn. A first one or more models of the recognizer may detect that the car is moving above the threshold speed while a second one or more models of the recognizer may detect that the car is approaching a turn (e.g., based on a known position of the car within a racing environment or based on a detected turn shown in a display).

Figure 4B:
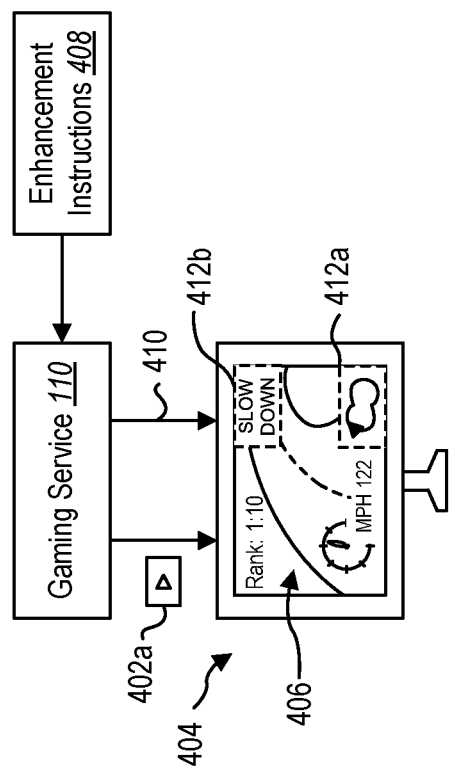
FIGS. 4A-4B illustrate an example implementation in which a presentation of a gaming session is enhanced in accordance with one or more embodiments.
Figure 4A:
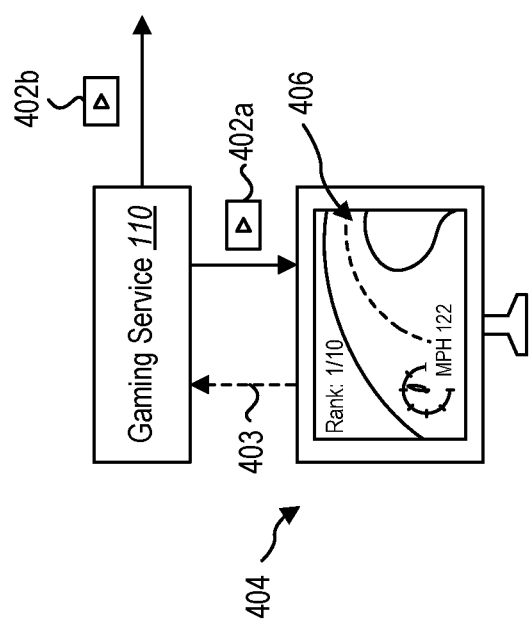

FIG. 4B shows one or more enhancements presented via a gaming session in accordance with one or more examples mentioned above. For example, as shown in FIG. 4B, the gaming service 110 may receive enhancement instructions 408 from an event analysis system 114 that indicates one or more enhancements or augmentations associated with detected events that should be made to the gaming content 402a being provided to the client device 404. Upon receiving the enhancement instructions 408, the gaming service 110 may provide one or more enhancements 410 to be presented in combination with the gaming content 402a being streamed to the client device 404.

As shown in FIG. 4B, the enhanced presentation includes a first enhancement 412a in which a mini-map is displayed in a lower-right hand corner of the graphical user interface 406. While the mini-map may be generated based on any number or combination of signals, including a combination of real-time observed signals and previously collected and analyzed signals, the mini-map may include a map representative of a race-track and an icon indicating a current position of a car within the virtual environment relative to the race-track.

As another example, the enhanced presentation may include a second enhancement 412b in which a "SLOW DOWN!" warning is displayed over a portion of the graphical user interface 406. In accordance with one or more embodiments described herein, this enhancement may be generated based on a recognizer being trained to detect an instance of a car traveling faster than a threshold speed and approaching an upcoming turn in-game. In addition, similar to other implementations described herein, the enhancement instructions may be associated with the particular combination of detected signals and/or events corresponding to the recognizer(s) that is trained to detect the specific event.

FIGS. 4A-4B illustrate features and functionalities that may be applicable to a number of use-cases. As an example, the racing application may refer to a previously released gaming application for an older generation of a gaming system. In one or more embodiments, specific recognizers and corresponding enhancements may be trained and otherwise identified based on newer features that have been added to current or newer versions of similar gaming titles. For example, where newer editions of a game have a mini-map, users of the older title may wish to include a similar mini-map while enjoying specific features of the older title. However, because developing a software patch or adding functionality to the older title may be difficult or even impossible without significant development costs (or simply redeveloping the entire gaming application), event detection and enhancement features described herein can provide a low-cost and non-invasive solution for adding various features to older gaming titles. Further, while FIGS. 4A-4B illustrate an example in which enhancements may be added to a racing application, similar features and functionality related to enhancing older titles of previously released gaming application can be applied to virtually any genre of gaming applications.

As another example, and in accordance with one or more embodiments described above, the features and functionalities described in connection with embodiments herein may be applied across multiple publishers and even across multiple genres of games. As an example, where an event is "winning a race," one or more recognizers associated with winning a race can be applied to a wide variety of races that occur within gaming application. For instance, winning a race may apply to a car racing game, such as the example described in connection with FIG. 4A. However, other games have variations of racing games, such as role-playing games (RPGs) having various side-quests and/or first-person games in which multiple players compete to perform a task in a limited period of time.

As another example, one or more embodiments may involve detecting events that may be related to providing enhancements in future gaming sessions or in connection with gaming sessions of other users of a gaming service 110. For example, in one or more embodiments, the gaming enhancement system 108 may detect various events that occur on a first run-through of a gaming application for a user. On a subsequent or future gaming session, the gaming enhancement system 108 may cause one or more enhancements to be presented based on detected events of the previous gaming session(s). For example, where a player approaches a decision or fork in a path, the gaming enhancement system 108 may cause a pop-up icon or other visual enhancement to be presented indicating that the player took a certain path on a previous gaming session. As another example, the gaming enhancement system 108 may cause the pop-up icon to indicate what other players of the gaming service 110 has done, such as what friends of a user have done or whether a popular gamer (e.g., a famous streamer or other content creator) has done in the past when confronted with a similar in-game decision.

In these examples, the systems described herein may train recognizers that make use of multiple different machine learning models that are trained to detect race-winning events across different types of gaming applications. For example, a first one or more models may be trained to detect a car-racing win based on text displayed on a screen in combination with one or more observable signals. Conversely, a second one or more models may be trained to detect a first-person win based on text displayed at a different location or based on other observable feature from gaming content presented via a client system (e.g., a display of a reward associated with winning a race, a detected sound associated with winning the race). Each of these models may be incorporated within a single recognizer. Alternatively, multiple recognizers may be trained to detect different instances of a common event.

Figure 5:
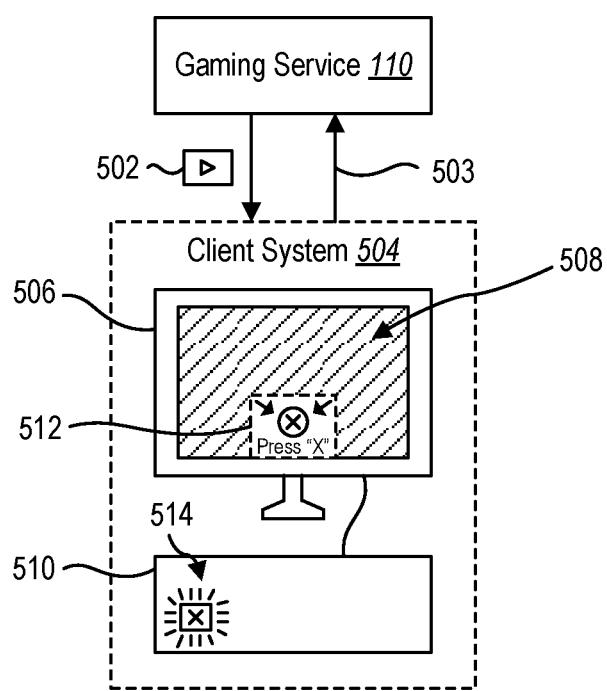
FIG. 5 illustrates another example implementation in which a presentation of a gaming session is enhanced in accordance with one or more embodiments.

While FIGS. 4A-4B illustrate an example in which an event is detected based on visual content and where an enhancement relates to a visual enhancement presented via a graphical user interface of a client device, FIG. 5 illustrates another example in which an enhancement may related to non-visual enhancements. For example, FIG. 5 illustrates an example gaming service that provides original gaming content 502 to a client system 504 including a display device 506 having a graphical user interface 508 presented thereon and an input device 510 (e.g., a keyboard) communicatively coupled to the display device 506. As shown in FIG. 5, the client system 504 can provide input commands 503 for execution by the gaming service 110, which can be incorporated within the gaming content 502 delivered to the client system 504.

As indicated above in connection with FIG. 3, enhancement instructions may be received at the gaming service 110 and/or the client system 504. For purposes of this example, gaming enhancement instructions may be received at the client system 504 to be implemented by hardware of the client system 504 with or without additional enhancement input from the gaming service 110.

In this example, a recognizer may detect an event associated with display of a press "x" indicator 512 displayed via the graphical user interface 508 of the display device 506. In accordance with examples described above, a recognizer may be trained to selectively evaluate the specific portion of the gaming content 502 (e.g., based on a segmentation map or other indication of a region of interest) to detect specific text corresponding to a press "x" event. In response to detecting this event, the client system 504 may be instructed to perform any number of enhancement functions corresponding to the detected event.

For example, in this implementation shown in FIG. 5, an x-key 514 on the input device 510 may light up to indicate the x-key that the user should press based on the content displayed on the display device 506. This visual feedback, while not displayed, can provide a significant enhancement to the gaming experience in providing a more enjoyable gaming experience as well as providing additional instruction to a user of the gaming application. This can be provided in conjunction with gaming tutorials or just as an additional aid that is made possible by features and functionality of the systems described herein.

While one or more examples described herein may relate specifically to enhancements being executed on server devices of a gaming enhancement system 108 or, alternatively, hardware of a client system 106, it will be appreciated that specific examples described in connection with enhancement instructions being provided to and executed by respective systems may be implemented by one or both of the gaming enhancement system 108 and/or client system 106. For example, while examples discussed above in relation to FIGS. 4A-4B were described in connection with enhancement instructions being provided to and executed on a gaming service 110, similar enhancements may be carried out in whole or in-part on the client system 106. As another example, while FIG. 5 was described in connection with enhancement instructions being provided to and executed on the client system 106, similar enhancements may be received and executed or otherwise carried out on the gaming service 110 and provided to the client system 106 in conjunction with the gaming content.

Figure 6:
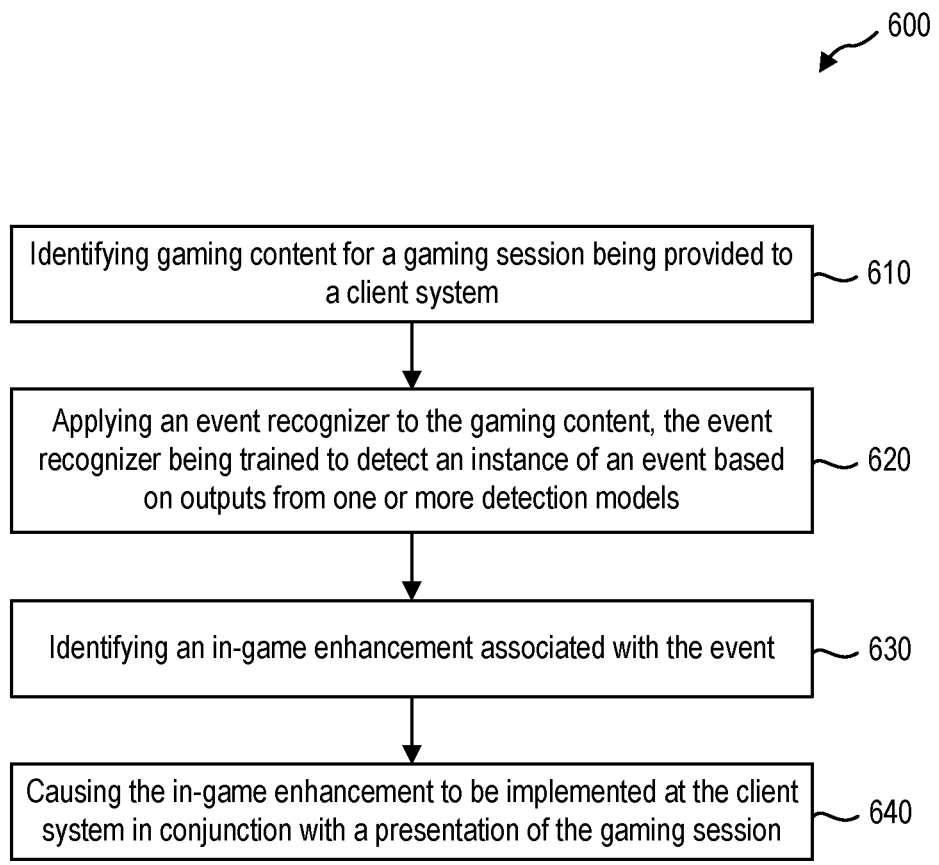
FIG. 6 illustrates an example series of acts showing enhancement of a gaming session in accordance with one or more embodiments.

Turning now to FIG. 6, this figure illustrates example flowcharts including series of acts for detecting in-game events and implementing enhancements to a gaming session based on the detected in-game events. While FIG. 6 illustrates acts according to one or more embodiments, alternative embodiments may omit, add to, reorder, and/or modify any of the acts shown in FIG. 6. Moreover, one or more of the individual features and functionalities described in connection with individual acts or series of acts in connection with FIG. 6 may similarly apply to other embodiments and examples described herein. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

As indicated above, FIG. 6 illustrates a series of act 600 related to detecting in-game event and implementing enhancements to a gaming session based on the detected in-game events. As shown in FIG. 6, the series of acts 600 includes an act 610 of identifying gaming content for a gaming session being providing to a client system. For example, in one or more implementations, the act 610 involves identifying gaming content for a gaming session, the gaming content including video content being provided to a client system by a gaming server on a cloud computing system.

As further shown, the series of acts 600 includes an act 620 of applying an event recognizer to the gaming content, the event recognizer being trained to detect an instance of an event based on outputs from one or more detection models. For example, in one or more implementations, the act 620 involves applying a first event recognizer to the gaming content to detect an instance of an event where the first event recognizer includes a first one or more detection models that are trained to output one or more signals associated with occurrence of a given instance of the event based on gaming content for a corresponding gaming session. In one or more embodiments, the first one or more detection models include machine learning models that are applied to video frames of the gaming content at a same time that the gaming content is provided to the client system.

As further shown, the series of acts 600 includes an act 630 of identifying an in-game enhancement associated with the event. As further shown, the series of acts 600 may include an act 640 of causing the in-game enhancement to be implemented at the client system in conjunction with a presentation of the gaming session. For example, in one or more embodiments, the act 640 involves, causing, based on the first event recognizer detecting the instance of the event, the in-game enhancement to be implemented at the client system in conjunction with a presentation of the gaming session on the client system.

In one or more embodiments, the gaming content includes video gaming content being streamed to the client system by the gaming server. Further, in one or more embodiments, the gaming content includes one or more of audio content and controller inputs. In one or more embodiments, the one or more detection models are trained to output the one or more signals associated with occurrence of the given instance of the event based on a combination of two or more of the video gaming content, the audio content, and the controller inputs.

In one or more embodiments, the first event recognizer includes a first one or more detection models trained to output one or more signals associated with occurrence of the given instance of the event based on gaming content originating from a first gaming application. The first event recognizer may further include a second one or more detection models trained to output one or more signals associated with occurrence of the given instance of the event based on gaming content originating from a second gaming application.

In one or more embodiments, the first gaming application is a previously released version of the second gaming application. Further, in one or more embodiments, the first gaming application and the second gaming application are associated with different publishers. In one or more embodiments, the first gaming application and the second gaming application are associated with different genres of gaming applications.

In one or more embodiments, the series of acts 600 includes applying a second event recognizer to the gaming content to detect an instance of a second event where the second event recognizer includes a second one or more detection models that are trained to output one or more signals associated with occurrence of a given instance of the second event based on gaming content for a corresponding gaming session. The series of acts 600 may further include identifying a second in-game enhancement associated with the second event and causing, based on the second event recognizer detecting the instance of the second event, the second in-game enhancement to be implemented at the client system in conjunction with the presentation of the gaming session on the client system and in conjunction with the in-game enhancement associated with the instance of the first event.

In one or more embodiments, the in-game enhancement includes a graphical user interface (GUI) enhancement associated with displaying one or more graphical icons over a display of the gaming session on a GUI of the client system. In one or more embodiments, the in-game enhancement includes an input device enhancement associated with tactile or visual feedback presented via an input device of the client system.

In one or more embodiments, causing the in-game enhancement to be implemented at the client system includes receiving augmented video content from the gaming server including both the video content and one or more enhancements to the video content to be presented via a graphical user interface (GUI) of the client system. In one or more embodiments, causing the in-game enhancement to be implemented at the client system includes receiving one or more enhancement commands from a data analysis service on the cloud computing system and locally executing the one or more enhancement commands on hardware of the client system.

Figure 7:
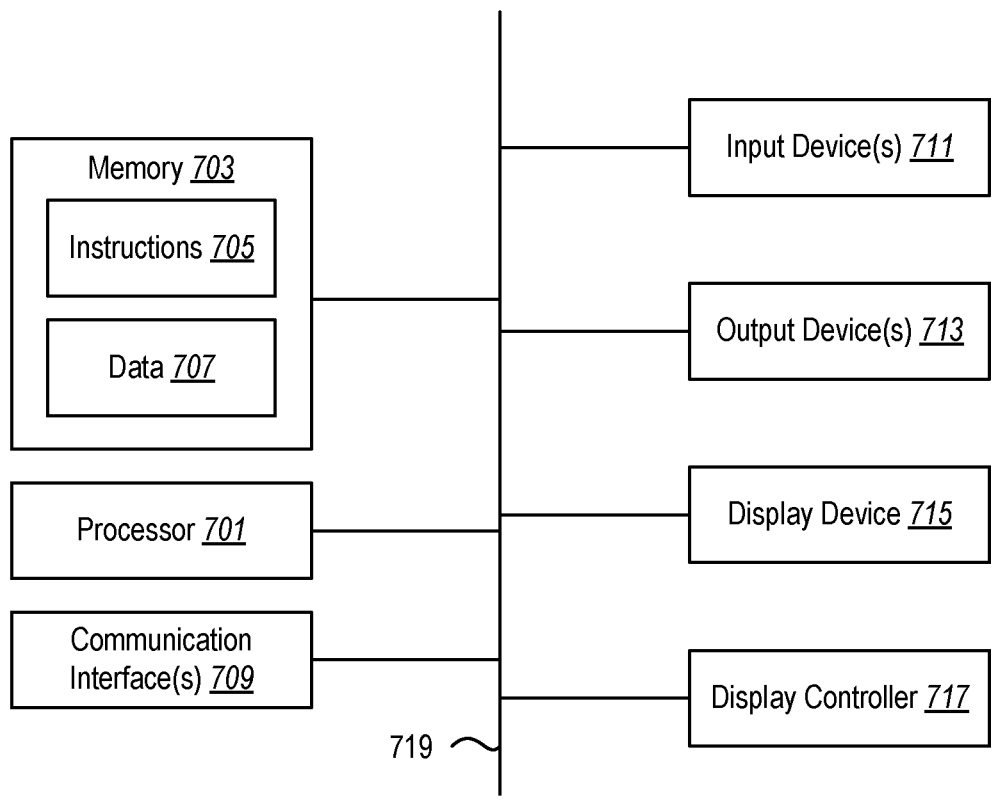
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method being implemented by one or more server devices on a cloud computing system, the method comprising:
   obtaining a video portion of gaming content of a gaming session, the video portion being obtained from gaming content as the gaming content is provided to a client system from a gaming server on the cloud computing system;
   applying a first event recognizer to the video portion of the gaming content to detect an instance of an event, wherein the first event recognizer includes one or more detection models that are trained to output one or more signals associated with occurrence of a given instance of the event based on video portions of gaming content for a corresponding gaming session, wherein the first event recognizer recognizes the event based on content of one or more video frames of the video portion;
   identifying an in-game enhancement associated with the event; and
   causing, based on the first event recognizer detecting the instance of the event, the in-game enhancement to be implemented at the client system in conjunction with a presentation of the gaming session on the client system.

2. The method of claim 1, wherein the gaming content includes video gaming content being streamed to the client system by the gaming server, the video gaming content corresponding to the video portion of gaming content obtained as the gaming content is provided to the client system.

3. The method of claim 2, wherein the gaming content further includes one or more of audio content and controller inputs, and wherein the one or more detection models are trained to output the one or more signals associated with occurrence of the given instance of the event based on a combination of two or more of the video gaming content, the audio content, and the controller inputs.

4. The method of claim 1, wherein the first event recognizer includes:
   a first one or more detection models trained to output at least one signal associated with occurrence of the given instance of the event based on gaming content originating from a first gaming application; and
   a second one or more detection models trained to output at least one signal associated with occurrence of the given instance of the event based on gaming content originating from a second gaming application.

5. The method of claim 4, wherein:
   the first gaming application is a previously released version of the second gaming application;
   the first gaming application and the second gaming application are associated with different publishers; or
   the first gaming application and the second gaming application are associated with different genres of gaming applications.

6. The method of claim 1, further comprising:
   applying a second event recognizer to the video portion of gaming content to detect an instance of a second event, wherein the second event recognizer includes a second one or more detection models that are trained to output one or more signals associated with occurrence of a given instance of the second event based on video portions gaming content for a corresponding gaming session;
   identifying a second in-game enhancement associated with the second event; and
   causing, based on the second event recognizer detecting the instance of the second event, the second in-game enhancement to be implemented at the client system in conjunction with the presentation of the gaming session on the client system and in conjunction with the in-game enhancement associated with the instance of the event.

7. The method of claim 1, wherein the in-game enhancement includes a graphical user interface (GUI) enhancement associated with displaying one or more graphical icons over a display of the gaming session on a GUI of the client system.

8. The method of claim 1, wherein the in-game enhancement includes an input device enhancement associated with tactile or visual feedback presented via an input device of the client system.

9. The method of claim 1, wherein causing the in-game enhancement to be implemented at the client system includes receiving augmented video content from the gaming server including both the video portion of gaming content and one or more enhancements to the gaming content to be presented via a graphical user interface (GUI) of the client system.

10. The method of claim 1, wherein causing the in-game enhancement to be implemented at the client system includes:
    receiving one or more enhancement commands from a data analysis service on the cloud computing system; and
    locally executing the one or more enhancement commands on hardware of the client system.

11. The method of claim 1, wherein the one or more detection models include machine learning models that are applied to video frames of the gaming content at a same time that the gaming content is provided to the client system.

12. A system being implemented by one or more server devices on a cloud computing system, the system comprising:
    one or more processors;
    memory in electronic communication with the one or more processors; and
    instructions stored in the memory, the instructions being executable by the one or more processors to:

obtain a video portion of gaming content of a gaming session, the video portion being obtained from gaming content as the gaming content is provided to a client system from a gaming server on the cloud computing system;

apply a first event recognizer to the video portion of the gaming content to detect an instance of an event, wherein the first event recognizer includes one or more detection models that are trained to output one or more signals associated with occurrence of a given instance of the event based on video portions of gaming content for a corresponding gaming session, wherein the first event recognizer recognizes the event based on content of one or more video frames of the video portion;

identify an in-game enhancement associated with the event; and cause, based on the first event recognizer detecting the instance of the event, the in-game enhancement to be implemented at the client system in conjunction with a presentation of the gaming session on the client system.

13. The system of claim 12, wherein the gaming content includes video gaming content being streamed to the client system by the gaming server, the video gaming content corresponding to the video portion of gaming content obtained as the gaming content is provided to the client system.

14. The system of claim 13, wherein the gaming content further includes one or more of audio content and controller inputs, and wherein the one or more detection models are trained to output the one or more signals associated with occurrence of the given instance of the event based on a combination of two or more of the video gaming content, the audio content, and the controller inputs.

15. The system of claim 12, wherein the in-game enhancement includes one or more of:

a graphical user interface (GUI) enhancement associated with displaying one or more graphical icons over a display of the gaming session on a GUI of the client system; or an input device enhancement associated with tactile or visual feedback presented via an input device of the client system.

16. The system of claim 12, wherein causing the in-game enhancement to be implemented at the client system includes receiving augmented video content from the gaming server including both the video portion of gaming content and one or more enhancements to the gaming content to be presented via a graphical user interface (GUI) of the client system.

17. The system of claim 12, wherein causing the in-game enhancement to be implemented at the client system includes:

receiving one or more enhancement commands from a data analysis service on the cloud computing system; and locally executing the one or more enhancement commands on hardware of the client system.

18. A non-transitory computer-readable medium storing instructions thereon, that when executed by one or more processors, causes a computing system to:

obtain a video portion of gaming content of a gaming session, the video portion being obtained from gaming content as the gaming content is provided to a client system from a gaming server on the cloud computing system;

apply a first event recognizer to the video portion of the gaming content to detect an instance of an event, wherein the first event recognizer includes one or more detection models that are trained to output one or more signals associated with occurrence of a given instance of the event based on video portions of gaming content for a corresponding gaming session, wherein the first event recognizer recognizes the event based on content of one or more video frames of the video portion;

identify an in-game enhancement associated with the event; and cause, based on the first event recognizer detecting the instance of the event, the in-game enhancement to be implemented at the client system in conjunction with a presentation of the gaming session on the client system.

19. The non-transitory computer-readable medium of claim 18, wherein the in-game enhancement includes one or more of:

a graphical user interface (GUI) enhancement associated with displaying one or more graphical icons over a display of the gaming session on a GUI of the client system; or an input device enhancement associated with tactile or visual feedback presented via an input device of the client system.

20. The non-transitory computer-readable medium of claim 18, wherein causing the in-game enhancement to be implemented at the client system includes one or more of:

receiving augmented video content from the gaming server including both the video portion of gaming content and one or more enhancements to the gaming content to be presented via a graphical user interface (GUI) of the client system; or receiving one or more enhancement commands from a data analysis service on the cloud computing system and locally executing the one or more enhancement commands on hardware of the client system.

* * * * *